L. T. BURNHAM.
HAND HARVESTING DEVICE.
APPLICATION FILED JAN. 17, 1913.
1,135,569. Patented Apr. 13, 1915.
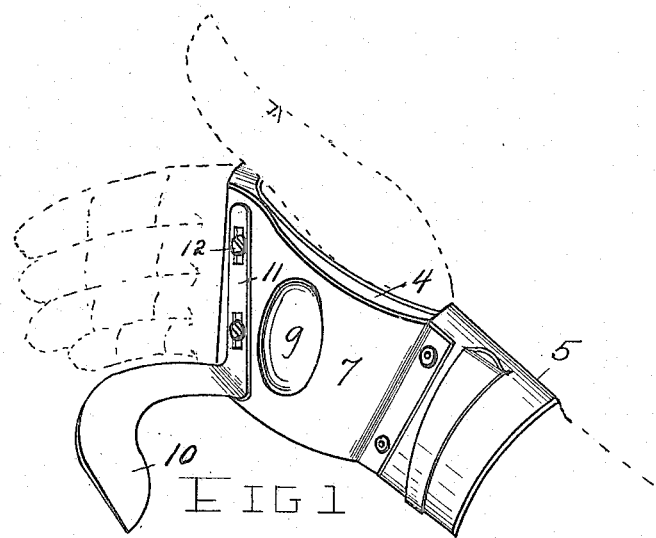
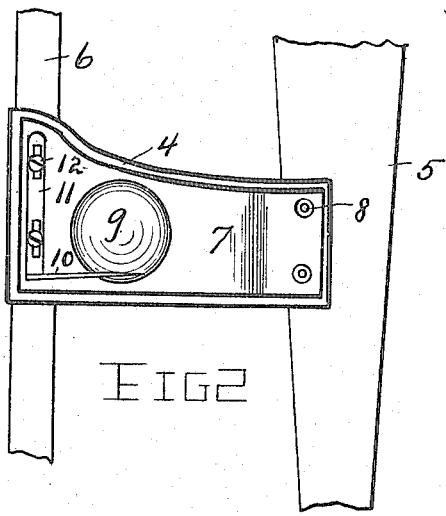
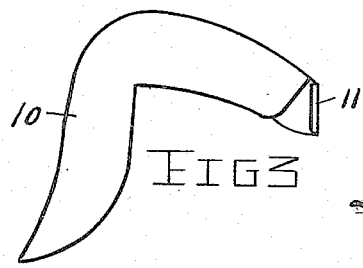

UNITED STATES PATENT OFFICE.

LOUIS T. BURNHAM, OF HINTON, OKLAHOMA, ASSIGNOR OF ONE-HALF TO NORTON A. SIMMONS, OF HINTON, OKLAHOMA.

HAND HARVESTING DEVICE.

1,135,569.     Specification of Letters Patent.     Patented Apr. 13, 1915.

Application filed January 17, 1913. Serial No. 742,632.

*To all whom it may concern:*

Be it known that I, LOUIS T. BURNHAM, a citizen of the United States, residing at Hinton, in the county of Caddo and State of Oklahoma, have invented a certain new and useful Hand Harvesting Device, of which the following is a specification, reference being had to the accompanying drawings.

This invention has a general reference to harvesting implements, and a more special reference to that class of devices in the art that are applied to the hand for reaping various products, and the special application of the invention, as set forth for purpose of an intelligent description of the invention, is means for harvesting the heads of kafir corn, such application, however is not to be construed as confining the invention to such use.

It is an object of the invention to provide means, such as a shield for the hand, and means to carry the same upon the hand, to associate a knife, and to render such knife adjustable at will.

Another object of the invention is to provide in connection with the shield, palm-supporting and finger-ball receiving means.

Other and equally important objects of the invention will become apparent from a detail reading of the following specification.

As before intimated, the invention, for purposes of illustration is applied in the form of a hand-reaping device, and Figure 1 is a perspective view of the device and associated with a hand—said hand being in dotted lines, and the rear portion of the perspective being omitted for purposes of clearness. Fig. 2 is a fragmental view of the device, and Fig. 3 illustrates in elevation one of the forms of knives that may be employed in connection with the device.

In the views, similar characters of reference indicate similar parts.

Any suitable form of hand stall may be employed by which to secure the device to the hand, and in the present instance the same may comprise a palm piece 4, to which may be connected, in any suitable manner, a wrist-band 5, and a binding strap 6. Notwithstanding this special description of the stall, however, it may be mentioned that a complete glove or other suitable carrying device may be adopted to which to apply the harvesting device.

Adapted to be suitably removably applied or affixed to the structure thus described, is a palm-shield 7, which, in the present instance is formed from sheet metal, but which may be formed from any suitable material, and the same, in this instance is secured to the wrist-band 5 by rivets 8, if it is desired to permanently affix the same to the hand-stall, or the same may be otherwise suitably affixed thereto.

In the present instance, and preferably so, this palm shield 7 may be dished or depressed as at 9, so that when the hand grips that which is to be harvested, the balls of the fingers may rest in the dished portion, and not only make more room for more tightly gripping the product, but also aid in a more stable purchase upon the same, and at the same time, this dished portion 9 becomes a substantial support for the arch of the palm, thus rendering the use of the device less tiresome.

Suitably applied to this palm-shield 7 is a suitable nipping or severing device, such, for instance, as a knife, the shank 11 of which may be applied in any suitable manner to said shield, as for instance, in manner shown, wherein said shank is provided with elongated slots through which screws are passed to the rear of the shield 4, and which screws 12 also may be employed as means by which to hold the strap 6 in place. By operating the screws, the shank may be shifted and the nipping or severing device may be adjusted relative to the hand and shield.

Within the purview of this invention, any sort of severing device may be employed, including those of various shapes and of varied operation, and it will be noted that so long as such nipping or severing devices, depending for a manual stroke for operation, are applied to shields to be carried by the hand, such will be considered to be comprehended by the invention herein disclosed. The blade 10 illustrated in the drawings has been found in practice to contain merit, in view of the fact of perfect severance; that shown in Fig. 3 also being of advantage in certain classes of work, but it is to be clearly understood that any tool for the service intended may be applied within the purview of the invention.

It will now be noted that I have provided a reaping instrument to be carried by the hand, one capable of suitable adjustments, and one adapted to be provided with a variety of tools.

Having thus described this invention, I claim:

1. A hand harvesting device comprising a hand shield of pliable material, means to secure the same to the hand, a metal shield adapted to be carried thereby and having a dished position for the ends of the fingers while gripping a stalk, and a knife for cutting said stalk.

2. A hand harvesting implement, comprising a pliable hand-shield, means to secure the same to the hand, a dished metal palm shield, adapted to be carried by the pliable shield, a knife, a shank therefor, and means to adjust the shank on the metal shield.

LOUIS T. BURNHAM.

Witnesses:
FRINK. G. SPRAKER,
ANNIE SPEARS.